United States Patent
Kim et al.

(10) Patent No.: US 12,096,250 B2
(45) Date of Patent: Sep. 17, 2024

(54) METHOD AND APPARATUS FOR USING ARTIFICIAL INTELLIGENCE/MACHINE LEARNING MODEL IN WIRELESS COMMUNICATION NETWORK

(71) Applicant: IUCF-HYU (INDUSTRY-UNIVERSITY COOPERATION FOUNDATION HANYANG UNIVERSITY), Seoul (KR)

(72) Inventors: Sunwoo Kim, Seoul (KR); Hongseok Jung, Seoul (KR); Minsoo Jeong, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 0 days.

(21) Appl. No.: 18/599,108

(22) Filed: Mar. 7, 2024

(65) Prior Publication Data
US 2024/0214840 A1   Jun. 27, 2024

Related U.S. Application Data

(63) Continuation of application No. PCT/KR2023/009926, filed on Jul. 12, 2023.

(30) Foreign Application Priority Data

Jul. 12, 2022 (KR) .................. 10-2022-0085576
Jul. 11, 2023 (KR) .................. 10-2023-0089940

(51) Int. Cl.
*H04W 24/02* (2009.01)
*H04L 41/16* (2022.01)

(52) U.S. Cl.
CPC ............ *H04W 24/02* (2013.01); *H04L 41/16* (2013.01)

(58) Field of Classification Search
CPC ..................................... H04W 24/02
USPC ..................................... 455/422.1
See application file for complete search history.

(56) References Cited

U.S. PATENT DOCUMENTS

| | | |
|---|---|---|
| 2021/0390434 A1 | 12/2021 | Bai et al. |
| 2022/0012645 A1 | 1/2022 | Ying et al. |
| 2022/0103221 A1 | 3/2022 | Taherzadeh Boroujeni et al. |
| 2023/0062010 A1 * | 3/2023 | Malboubi ............ H04W 24/08 |
| 2023/0325706 A1 * | 10/2023 | Kesavareddigari ...... G06N 5/04 |
| | | 706/12 |

OTHER PUBLICATIONS

International Search Report issued from the WIPO dated Jul. 12, 2023 for the PCT International Application No. PCT/KR2023/009926.

(Continued)

*Primary Examiner* — Joel Ajayi

(57) ABSTRACT

The present embodiments provide a method by which a terminal uses an AI/ML model in a wireless communication network, the method comprising the steps of receiving activation or deactivation instruction information for the AI/ML model; activating or deactivating the AI/ML model on the basis of the instruction information; and transmitting a response to activation or deactivation of the AI/ML model.

18 Claims, 14 Drawing Sheets

(56) References Cited

OTHER PUBLICATIONS

Written Opinion of International Search Authority issued from the WIPO dated Jul. 12, 2023 for the PCT International Application No. PCT/KR2023/009926.
Qualcomm Incorporated. General Aspects of AI/ML Framework. 3GPP TSG RAN WG1 #109-e. R1-2205023. e-Meeting. Apr. 29, 2022.
Fujitsu. Discussions on general aspects of AI/ML framework. 3GPP TSG RAN WG1 #109-e. R1-2205075. e-Meeting. Apr. 29, 2022.

* cited by examiner

METHOD AND APPARATUS FOR USING ARTIFICIAL INTELLIGENCE/MACHINE LEARNING MODEL IN WIRELESS COMMUNICATION NETWORK

CROSS-REFERENCE TO RELATED APPLICATIONS

This application is a continuation of pending PCT International Application No. PCT/KR2023/009926 filed on Jul. 12, 2023, and which claims priority under 35 U.S.C 119(a) to Korean Patent Application No. 10-2022-0085576 filed with the Korean Intellectual Property Office on Jul. 12, 2022, Korean Patent Application No. 10-2023-0089940 filed with the Korean Intellectual Property Office on Jul. 11, 2023. The disclosures of the above patent applications are incorporated herein by reference in their entirety.

TECHNICAL FIELD

The present embodiments relate to a method and device using an artificial intelligence/machine learning (AI/ML) model in a next-generation wireless access network (hereinafter, "new radio (NR)").

BACKGROUND ART

The 3GPP is designing a frame structure, channel coding and modulation, waveform and multiple access scheme, etc. for new radio (NR). NR requires a design for meeting various QoS requirements required for each of usage scenarios more broken down and specified and enhanced data rate as compared with LTE.

As representative usage scenarios of NR, enhancement mobile broadband (eMBB), massive machine type communication (mMTC), and ultra-reliable and low latency communications (URLLC) have been defined and, to meet the requirements for each usage scenario, a flexible frame structure as compared with LTE needs to be designed.

Each usage scenario has different requirements for data rates, latency, reliability, and coverage. Thus, a need arises for a scheme of efficiently multiplexing radio resource units based on different numerologies (e.g., subcarrier spacing, subframe, transmission time interval (TTI), etc.) as a method for efficiently meeting the requirements for each usage scenario via the frequency band constituting any NR system.

Meanwhile, for faster, more accurate, and more efficient communication in wireless communication technology, there is an increasing demand for introducing artificial intelligence or machine learning technology. Thus, a need arises for a specific design for using AI/ML models in wireless communication networks.

DETAILED DESCRIPTION

Technical Problem

Embodiments of the disclosure may provide a method and device using an AI/ML model in a wireless communication network.

Technical Solution

In an aspect, the present embodiments may provide a method for using an AI/ML model by a UE in a wireless communication network comprising receiving activation or deactivation instruction information for the AI/ML model, activating or deactivating the AI/ML model based on the instruction information, and transmitting a response to the activation or deactivation of the AI/ML model.

In another aspect, the present embodiments may provide a UE using an AI/ML model in a wireless communication network comprising a transmitter, a receiver, and a controller controlling an operation of the transmitter and the receiver, wherein the controller receives activation or deactivation instruction information for the AI/ML model, activates or deactivates the AI/ML model based on the instruction information, and transmits a response to the activation or deactivation of the AI/ML model.

Advantageous Effects

According to an embodiment of the present disclosure, there may be provided a method and device using an AI/ML model in a wireless communication network for a specific procedure according to use of an AI/ML model.

MODE FOR CARRYING OUT THE DISCLOSURE

Figure 1:
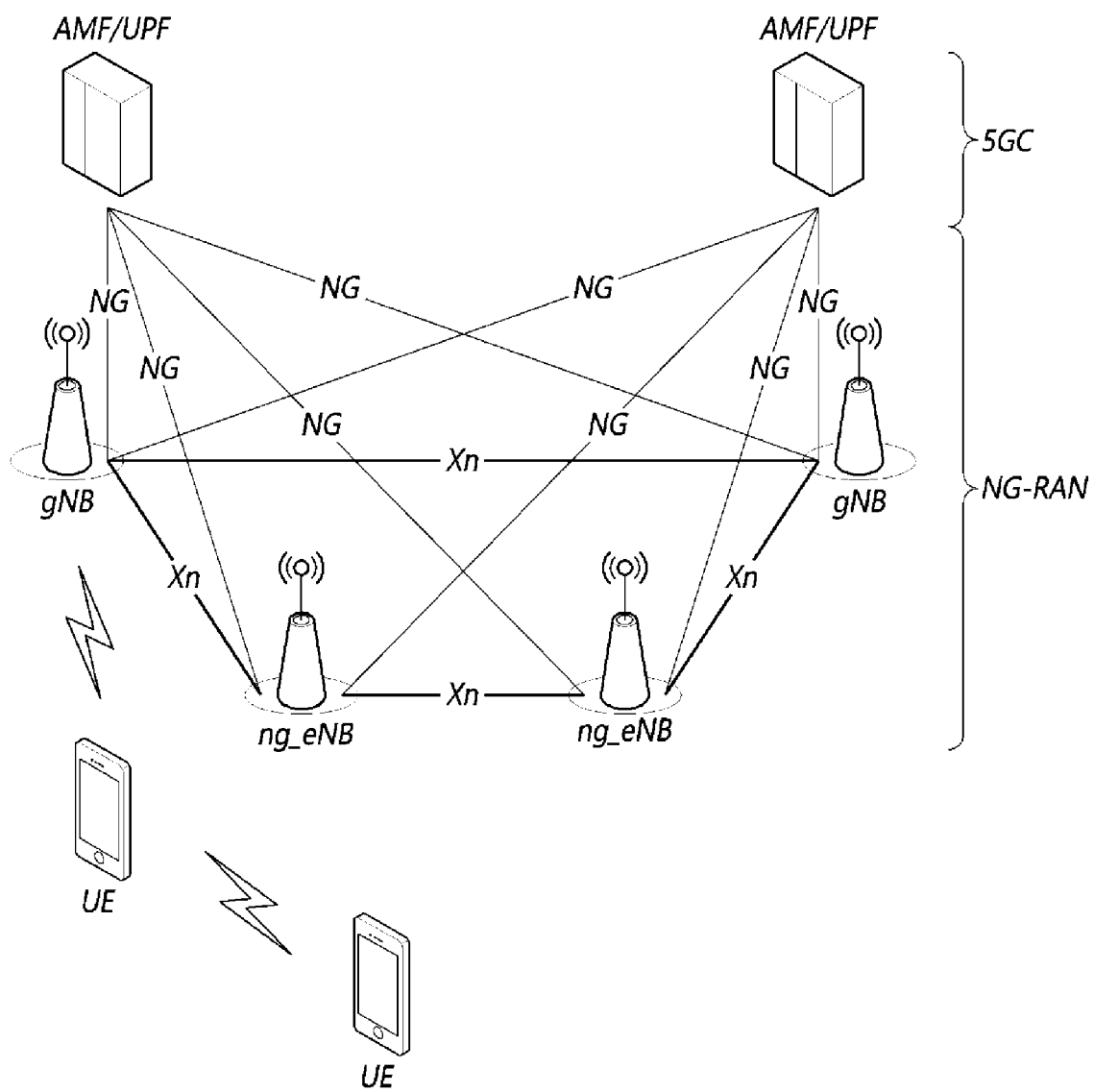
FIG. 1 is a view schematically illustrating a structure for an NR wireless communication system to which the present embodiments may apply.

Hereinafter, embodiments of the disclosure are described in detail with reference to the accompanying drawings. In assigning reference numerals to components of each drawing, the same components may be assigned the same numerals even when they are shown on different drawings. When determined to make the subject matter of the disclosure unclear, the detailed of the known art or functions may be skipped. The terms "comprises" and/or "comprising," "has" and/or "having," or "includes" and/or "including" when used in this specification specify the presence of stated features, regions, integers, steps, operations, elements, and/or components, but do not preclude the presence or addition of one or more other features, regions, integers, steps, operations, elements, components, and/or groups thereof. As used herein, the singular forms "a", "an" and "the" are intended to include the plural forms as well, unless the context clearly indicates otherwise.

Such denotations as "first," "second," "A," "B," "(a)," and "(b)," may be used in describing the components of the present disclosure. These denotations are provided merely to distinguish a component from another, and the essence, order, or number of the components are not limited by the denotations.

In describing the positional relationship between components, when two or more components are described as "connected", "coupled" or "linked", the two or more components may be directly "connected", "coupled" or "linked", or another component may intervene. Here, the other component may be included in one or more of the two or more components that are "connected", "coupled" or "linked" to each other.

When such terms as, e.g., "after", "next to", "after", and "before", are used to describe the temporal flow relationship related to components, operation methods, and fabricating methods, it may include a non-continuous relationship unless the term "immediately" or "directly" is used.

When a component is designated with a value or its corresponding information (e.g., level), the value or the corresponding information may be interpreted as including a tolerance that may arise due to various factors (e.g., process factors, internal or external impacts, or noise).

In the disclosure, 'wireless communication system' means a system for providing various communication services, such as voice and data packets, using a radio resource and may include a UE, a base station, or a core network.

The present embodiments disclosed below may be applied to wireless communication systems using various radio access technologies. For example, the present embodiments may be applied to various radio access technologies, such as code division multiple access (CDMA), frequency division multiple access (FDMA), time division multiple access (TDMA), orthogonal frequency division multiple access (OFDMA), single carrier frequency division multiple access (SC-FDMA), or non-orthogonal multiple access (NOMA). Further, radio access technology may mean not only a specific access technology, but also a communication technology for each generation established by various communication organizations, such as 3GPP, 3GPP2, Wi-Fi, Bluetooth, IEEE, and ITU. For example, CDMA may be implemented as radio technology, such as universal terrestrial radio access (UTRA) or CDMA2000. TDMA may be implemented as GSM (global system for mobile communications)/GPRS (general packet radio service)/EDGE (enhanced data rates for GSM evolution). OFDMA may be implemented with a wireless technology, such as institute of electrical and electronic engineers (IEEE) 802.11 (Wi-Fi), IEEE 802.16 (WiMAX), IEEE 802-20, evolved UTRA (E-UTRA), and the like. IEEE 802.16m is an evolution of IEEE 802.16e, and provides backward compatibility with IEEE 802.16e-based systems. UTRA is part of UMTS (universal mobile telecommunications system). 3GPP (3rd generation partnership project) LTE (long term evolution) is part of E-UMTS (evolved UMTS) using evolved-UMTS terrestrial radio access (E-UTRA) and adopts OFDMA for downlink and SC-FDMA for uplink. As such, the present embodiments may be applied to currently disclosed or commercialized radio access technologies and may also be applied to radio access technologies currently under development or to be developed in the future.

Meanwhile, in the disclosure, 'UE' is a comprehensive concept meaning a device including a wireless communication module that communicates with a base station in a wireless communication system and should be interpreted as a concept that may include not only user equipment (UE) in, e.g., WCDMA, LTE, NR, HSPA, and IMT-2020 (5G or new radio), but also a mobile station (MS), user terminal (UT), subscriber station (SS), or wireless device in GSM. Further, the UE may be a user portable device, such as a smartphone, according to the usage type and, in the V2X communication system, the UE may mean a vehicle or a device including a wireless communication module in the vehicle. Further, in the case of a machine type communication system, the UE may mean an MTC terminal, M2M terminal, or URLLC terminal equipped with a communication module to perform machine type communication.

In the disclosure, 'base station' or 'cell' refers to a terminal that communicates with a UE in terms of a network and in concept encompasses various coverage areas, such as node-B, evolved node-B (eNB), gNode-B (gNB), low power node (LPN), sector, site, various types of antennas, base transceiver system (BTS), access point, point (e.g. transmission point, reception point, or transmission/reception point), relay node, mega cell, macro cell, micro cell, pico cell, femto cell, remote radio head (RRH), radio unit (RU), or small cell. Further, 'cell' may mean one including a bandwidth part (BWP) in the frequency domain. For example, 'serving cell' may mean the activation BWP of the UE.

Since there is a base station controlling one or more cells in the various cells enumerated above, the base station may be interpreted in two meanings. The base station may be 1) a device itself which provides a mega cell, a macro cell, a micro cell, a pico cell, a femto cell, or a small cell in relation to the radio region, or 2) the radio region itself. In 1), all devices that provide a predetermined radio region and are controlled by the same entity or interact to configure a radio region via collaboration are denoted as base stations. An embodiment of the base station is a transmission/reception point, transmission point, or reception point depending on the scheme of configuring the radio region. In 2), the radio region itself, in which a signal is received or transmitted from the point of view of the UE or a neighboring base station may be the base station.

In the disclosure, 'cell' may mean the coverage of the signal transmitted from the transmission/reception point, a component carrier having the coverage of the signal transmitted from the transmission/reception point (transmission point or transmission/reception point), or the transmission/reception point itself.

Uplink (UL) means a scheme for transmitting/receiving data to and from the base station by the UE, and downlink (DL) means a scheme for transmitting/receiving data to/from the UE by the base station. Downlink may mean communication or communication path from the multiple transmission/transmission points to the UE, and uplink may mean communication or communication path from the UE to the multiple transmission/reception points. In this case, in the downlink, the transmitter may be part of the multiple transmission/reception points, and the receiver may be part of the UE. Further, in the uplink, the transmitter may be part of the UE, and the receiver may be part of the multiple transmission/reception points.

Uplink and downlink transmit/receive control information through a control channel, such as physical downlink control channel (PDCCH) or physical uplink control channel (PUCCH) and configure a data channel, such as physical downlink shared channel (PDSCH) or physical uplink shared channel (PUSCH), to transmit/receive data. Hereinafter, a context in which signals are transmitted/received through a channel, such as PUCCH, PUSCH, PDCCH, and PDSCH, is also referred to as 'transmits/receives PUCCH, PUSCH, PDCCH, and PDSCH.'

Although the technical spirit is described focusing primarily on the 3GPP LTE/LTE-A/new RAT (NR) communication system for clarity of description, the technical features are not limited to such communication system.

The 3GPP develops 5th-generation (5G) communication technology to meet the requirements of ITU-R's next-generation radio access technology after research on 4th-generation (4G) communication technology. Specifically, the 3GPP develops new NR communication technology separate from LTE-A pro and 4G communication technology, which have enhanced LTE-advanced technology to meet the requirements of ITU-R, as 5G communication technology. Both LTE-A pro and NR refer to 5G communication technologies. Hereinafter, 5G communication technology is described focusing on NR unless specified as a specific communication technology.

Operating scenarios in NR define various operating scenarios by adding considerations of satellites, automobiles, and new verticals in the existing 4G LTE scenarios and, from a service point of view, supports the enhanced mobile broadband (eMBB) scenario, the massive machine communication (mMTC) scenario that has high UE density but is deployed in a wide range to requires a low data rate and asynchronous access, and the ultra-reliability and low latency (URLLC) scenario that requires high responsiveness and reliability and may support high-speed mobility.

To meet such scenarios, NR discloses wireless communication systems that adopt a new waveform and frame structure technology, low-latency technology, ultra-high frequency band (mmWave) supporting technology, and forward compatibility providing technology. In particular, the NR system suggests various technical changes in terms of flexibility to provide forward compatibility. The main technical features of NR are described below with reference to the drawings.

<Overview of NR System>

FIG. 1 is a view schematically illustrating a structure for an NR system to which the present embodiments may apply.

Referring to FIG. 1, the NR system is divided into a 5G core network (5GC) and an NR-RAN part. The NG-RAN is constituted of gNB and ng-eNBs providing user plane (SDAP/PDCP/RLC/MAC/PHY) and user equipment (UE) control plane (RRC) protocol termination. The gNBs or the gNBs and the ng-eNBs are interconnected through the Xn interface. The gNB and the ng-eNB are connected to the 5GC through the NG interface. The 5GC may include an access and mobility management function (AMF) which is in charge of the control plane, such as UE access and mobility control function, and a user plane function (UPF) which is in charge of the user data control function. NR supports both the below-6 GHz frequency band (Frequency Range 1 (FR1) and above-6 GHz frequency band (Frequency Range 2 (FR2)).

The gNB means a base station that provides the UE with NR user plane and control plane protocol termination, and the ng-eNB means a base station that provides the UE with the E-UTRA user plane and control plane protocol termination. In the disclosure, the base station should be understood as encompassing gNB and ng-eNB and, as necessary, be used to separately denote gNB or ng-eNB.

<NR Waveform, Numerology, and Frame Structure>

NR uses the CP-OFDM waveform using the cyclic prefix for downlink transmission and CP-OFDM or DFT-s-OFDM for uplink transmission. OFDM technology is easily combined with multiple input multiple output (MIMO) and has the advantages of high frequency efficiency and capability of using a low-complexity receiver.

Meanwhile, since, in NR, the above-described three scenarios have different requirements for data rate, latency, and coverage, it is needed to efficiently meet the requirements for each scenario through the frequency band constituting any NR system. To that end, there has been proposed technology for efficiently multiplexing radio resources based on a plurality of different numerologies.

Specifically, the NR transmission numerology is determined based on the subcarrier spacing and cyclic prefix (CP) and, as shown in Table 1 below, it is exponentially changed, with the exponent value of 2 used as with respect to 15 kHz.

TABLE 1

| μ | subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
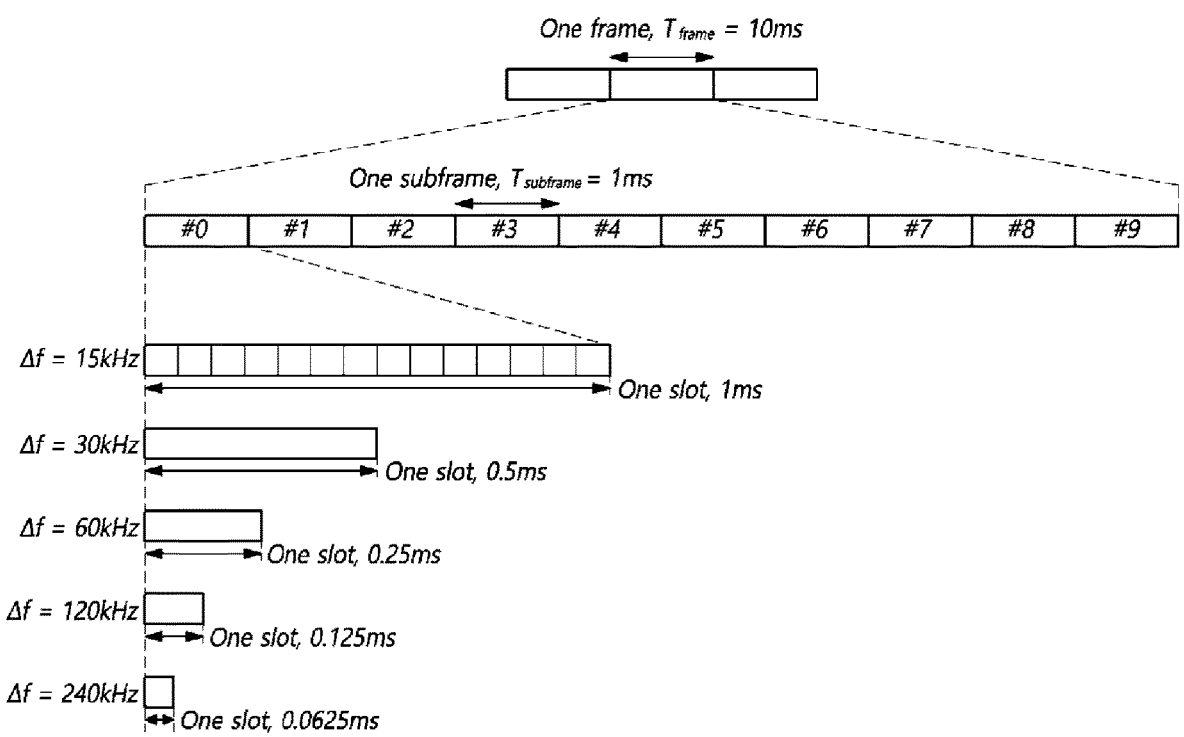
FIG. 2 is a view illustrating a frame structure in an NR system to which the present embodiments may apply.

As shown in Table 1 above, the NR numerologies may be divided into five types depending on the subcarrier spacing. This differs from the subcarrier spacing fixed to 15 kHz in LTE which is one 4G communication technology. Specifically, in NR, the subcarrier spacings used for data transmission are 15, 30, 60, and 120 kHz, and the subcarrier spacings used for synchronization signal transmission are 15, 30, 12, and 240 kHz. Further, the extended CP is applied only to the 60 kHz subcarrier spacing. Meanwhile, as the frame structure in NR, a frame having a length of 10 ms, which is constituted of 10 subframes having the same length of 1 ms, is defined. One frame may be divided into half frames of 5 ms, and each half frame may include 5 subframes. In the case of the 15 kHz subcarrier spacing, one subframe is constituted of one slot, and each slot is constituted of 14 OFDM symbols. FIG. 2 is a view illustrating a frame structure in an NR system to which the present embodiments may apply. Referring to FIG. 2, a slot is fixedly composed of 14 OFDM symbols in the case of the normal CP, but the length of the slot in the time domain may vary depending on the subcarrier spacing. For example, in the case of a numerology having a 15 kHz subcarrier spacing, a slot has the same length as the subframe, as the length of 1 ms. In contrast, in the case of a numerology having a 30 kHz subcarrier spacing, a slot is constituted of 14 OFDM symbols, but two slots may be included in one subframe, as the length of 0.5 ms. In other words, the subframe and the frame are defined as having a fixed length, and the slot is defined with the number of symbols, and the temporal length may vary depending on the subcarrier spacing.

Meanwhile, NR defined a slot as the basic unit for scheduling and, to reduce transmission latency in the radio section, adopted minislot (or subslot or non-slot based schedule). If a wide subcarrier spacing is used, the length of one slot is inverse-proportionally shortened, so that it is possible to reduce transmission latency in the radio section. The minislot is for efficient support of the URLLC scenario and enables scheduling in the units of 2, 4, or 7 symbols.

Further, NR defined uplink and downlink resource allocation as the symbol level in one slot, unlike LTE. To reduce HARQ latency, a slot structure has been defined which enables HARQ ACK/NACK to be transmitted directly in the transmission slot, and such slot structure is referred to as a self-contained structure in the description.

NR has been designed to be able to support a total of 256 slots and, among them, 62 slot formats are used in 3GPP Rel-15. Further, a common frame structure constituting the FDD or TDD frame is supported through a combination of various slots. For example, a slot structure in which the symbols of the slot all are configured as downlink, a slot structure in which all the symbols are configured as uplink, and a slot structure in which downlink symbols and uplink symbols are combined are supported. Further, NR supports data transmission that is distributed and scheduled in one or more slots. Therefore, the base station may inform the UE whether the slot is a downlink slot, uplink slot, or flexible slot using the slot format indicator (SFI). The base station may indicate the slot format by indicating the index of the table configured through UE-specific RRC signaling, by the SFI and may indicate it dynamically through downlink control information (DCI) or statically or semi-statically through RRC.

<NR Physical Resource>

In connection with the physical resource in NR, antenna port, resource grid, resource element, resource block, and bandwidth part are taken into consideration.

An antenna port is defined so that the channel carried by a symbol on an antenna port may be inferred from the channel carried by another symbol on the same antenna port. Where the large-scale property of the channel carrying a symbol on one antenna port may be inferred from the channel carrying a symbol on a different antenna port, the two antenna ports may be said to have a QC/QCL (quasi co-located or quasi co-location) relationship. Here, the large-scale properties include one or more of delay spread, Doppler spread, frequency shift, average received power, and received timing.

Figure 3:
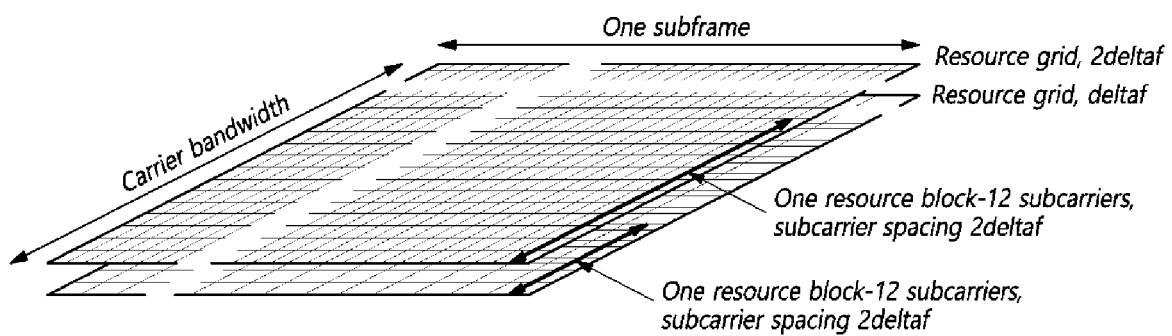
FIG. 3 is a view illustrating a resource grid supported by radio access technology to which the present embodiments may apply.

FIG. 3 is a view illustrating a resource grid supported by radio access technology to which the present embodiments may apply.

Referring to FIG. 3, since NR supports a plurality of numerologies in the same carrier, a resource grid may exist depending on each numerology. Further, the resource grid may exist depending on the antenna port, subcarrier spacing, or transmission direction.

The resource block is constituted of 12 subcarriers and is defined only in the frequency domain. Further, the resource element is constituted of one OFDM symbol and one subcarrier. Therefore, as shown in FIG. 3, the size of one resource block may vary depending on the subcarrier spacing. Further, in NR, "point A", which serves as a common reference point for the resource block grid, and common resource block and virtual resource block are defined.

Figure 4:
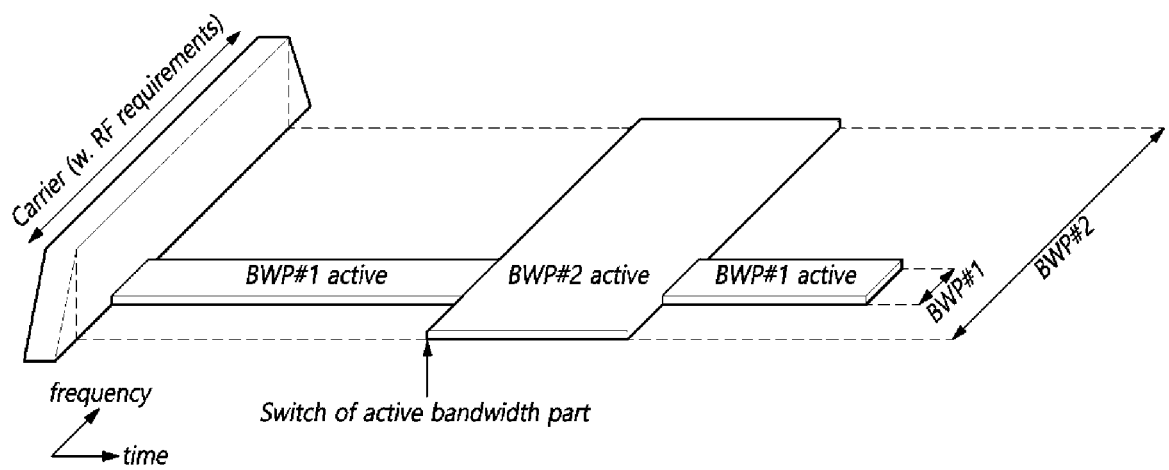
FIG. 4 is a view illustrating a bandwidth part supported by radio access technology to which the present embodiments may apply.

FIG. 4 is a view illustrating a bandwidth part supported by radio access technology to which the present embodiments may apply.

In NR, unlike LTE where the carrier bandwidth is fixed to 20 Mhz, the maximum carrier bandwidth from 50 Mhz to 400 Mhz is set for each subcarrier spacing. Therefore, it is not assumed that all UEs use all of these carrier bandwidths.

Accordingly, in NR, as shown in FIG. 4, a bandwidth part (BWP) may be designated within the carrier bandwidth and used by the UE. Further, the bandwidth part is associated with one numerology and is composed of a subset of contiguous common resource blocks and may be activated dynamically over time. Up to four bandwidth parts may be configured in the UE for each of uplink and downlink. Data is transmitted/received using the bandwidth part activated at a given time.

In the case of paired spectra, the uplink and downlink bandwidth parts are set independently, and in the case of unpaired spectra, the bandwidth parts of uplink and downlink are set to make a pair to share the center frequency so as to prevent unnecessary frequency re-tunning between downlink and uplink operations.

<NR Initial Access>

In NR, the UE performs a cell search and random access procedure to access the base station and perform communication.

Cell search is a procedure in which the UE is synchronized with the cell of the base station using the synchronization signal block (SSB) transmitted from the base station, obtains the physical layer cell ID, and obtains system information.

Figure 5:
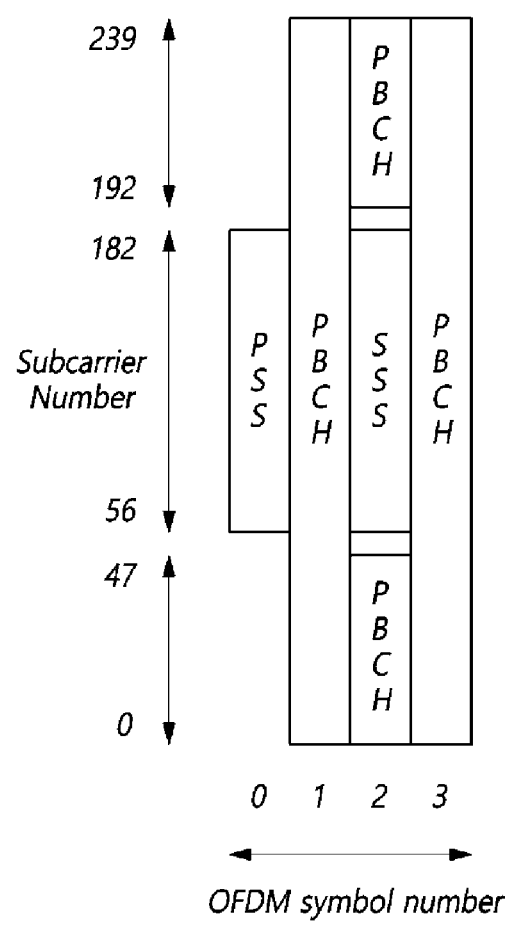
FIG. 5 is a view exemplarily illustrating a synchronization signal block in radio access technology to which the present embodiments may apply.

FIG. 5 is a view exemplarily illustrating a synchronization signal block in radio access technology to which the present embodiments may apply.

Referring to FIG. 5, the SSB is constituted of a primary synchronization signal (PSS) and a secondary synchronization signal (SSS) occupying 1 symbol and 127 subcarriers, respectively, and a PBCH spanning 3 OFDM symbols and 240 subcarriers.

The UE monitors the SSB in time and frequency domains and receives the SSB.

The SSB may be transmitted up to 64 times in 5 ms. Multiple SSBs are transmitted on different transmission beams within 5 ms time, and the UE performs detection assuming that SSBs are transmitted every 20 ms period based on one specific beam used for transmission. The number of beams available for SSB transmission within 5 ms may increase as the frequency band increases. For example, up to 4 SSB beams may be transmitted below 3 GHz, SSBs may be transmitted using up to 8 different beams in a frequency band of 3 to 6 GHz, and up to 64 different beams in a frequency band of 6 GHz or higher.

Two SSBs are included in one slot, and the start symbol and number of repetitions within the slot are determined according to the subcarrier spacing as follows.

Meanwhile, the SSB is not transmitted at the center frequency of the carrier bandwidth unlike the SS of conventional LTE. In other words, the SSB may be transmitted even in a place other than the center of the system band and, in the case of supporting wideband operation, a plurality of SSBs may be transmitted in the frequency domain. Accordingly, the UE monitors the SSB by a synchronization raster, which is a candidate frequency location for monitoring the SSB. The carrier raster and synchronization raster, which are the center frequency location information about the channel for initial access, are newly defined in NR, and the synchronization raster has a wider frequency interval than the carrier raster, enabling the UE to do a fast SSB search.

The UE may obtain the MIB through the PBCH of the SSB. The master information block (MIB) includes minimum information for the UE to receive remaining system information (remaining minimum system information (RMSI) broadcast by the network. Further, the PBCH may include information about the position of the first DM-RS symbol in the time domain, information for monitoring SIB1 by the UE (e.g., SIB1 numerology information, information related to SIB1 CORESET, search space information, PDCCH-related parameter information, etc.), offset information between the common resource block and the SSB (the absolute location of the SSB within the carrier is transmitted through SIB1), and the like. Here, the SIB1 numerology information is equally applied to some messages used in the random access procedure for the UE to access the base station after completing the cell search procedure. For example, the numerology information about SIB1 may be applied to at least one of messages 1 to 4 for the random access procedure.

The above-described RMSI may mean system information block 1 (SIB1). SIB1 is broadcast periodically (e.g., 160 ms) in the cell. SIB1 includes information necessary for the UE to perform an initial random access procedure, and is periodically transmitted through the PDSCH. To receive SIB1, the UE needs to receive numerology information used for SIB1 transmission and control resource set (CORESET) information used for SIB1 scheduling through the PBCH. The UE identifies scheduling information for SIB1 using SI-RNTI in CORESET and obtains SIB1 on PDSCH according to scheduling information. The remaining SIBs except for SIB1 may be transmitted periodically and may be transmitted at the request of the UE.

Figure 6:
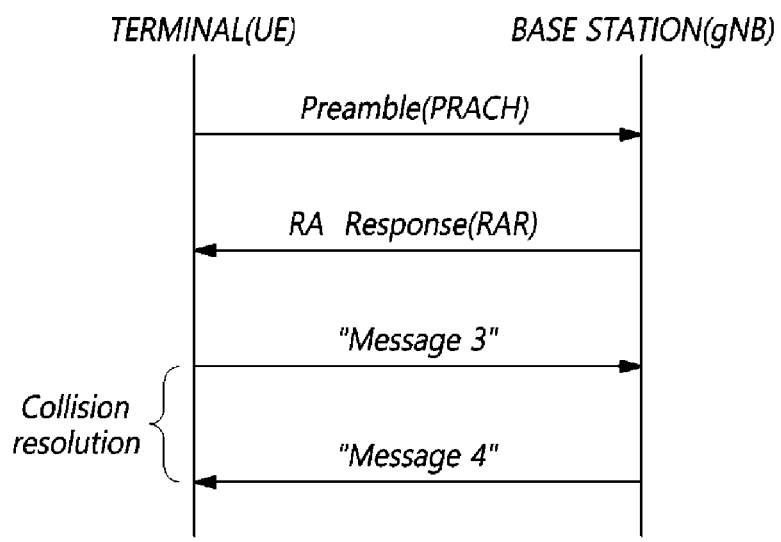
FIG. 6 is a view illustrating a random access procedure in radio access technology to which the present embodiments may apply.

FIG. 6 is a view illustrating a random access procedure in radio access technology to which the present embodiments may apply.

Referring to FIG. 6, if the cell search is completed, the UE transmits a random access preamble for random access to the base station. The random access preamble is transmitted through PRACH. Specifically, the random access preamble is transmitted to the base station through the PRACH composed of contiguous radio resources in a periodically repeated specific slot. In general, when the UE initially accesses the cell, a contention-based random access procedure is performed, and when random access is performed for beam failure recovery (BFR), a non-contention-based random access procedure is performed.

The UE receives a random access response to the transmitted random access preamble. The random access response may include a random access preamble identifier (ID), uplink radio resource (UL grant), temporary cell-radio network temporary identifier (C-RNTI), and time alignment command (TAC). Since one random access response may include random access response information for one or more UEs, the random access preamble identifier may be included to indicate to which UE the included UL grant, temporary C-RNTI, and TAC are valid. The random access preamble identifier may be an identifier for the random access preamble received by the base station. The TAC may be included as information for the UE to adjust uplink synchronization. The random access response may be indicated by the random access identifier on the PDCCH, that is, the random access-radio network temporary identifier (RA-RNTI).

Upon receiving a valid random access response, the UE processes information included in the random access response and performs scheduled transmissions to the base station. For example, the UE applies the TAC and stores the temporary C-RNTI. Further, the UE transmits data stored in the buffer of the UE or newly generated data to the base station using the UL grant. In this case, information that may identify the UE should be included.

Finally, the UE receives a downlink message for contention resolution.

<NR Coreset>

In NR, the downlink control channel is transmitted in a control resource set (CORESET) having a length of 1 to 3 symbols and transmits uplink/downlink scheduling information, slot format index (SFI), transmit power control (TPC) information, etc.

As such, NR introduced the concept of CORESET to secure the flexibility of the system. The control resource set (CORESET) means a time-frequency resource for a downlink control signal. The UE may use one or more search spaces in CORESET time-frequency resources to decode control channel candidates. A quasi co-location (QCL) assumption for each CORESET has been set, which is used for the purpose of indicating the characteristics of the analog beam direction in addition to the latency spread, Doppler spread, Doppler shift, and average latency, which are characteristics assumed by the conventional QCL.

Figure 7:
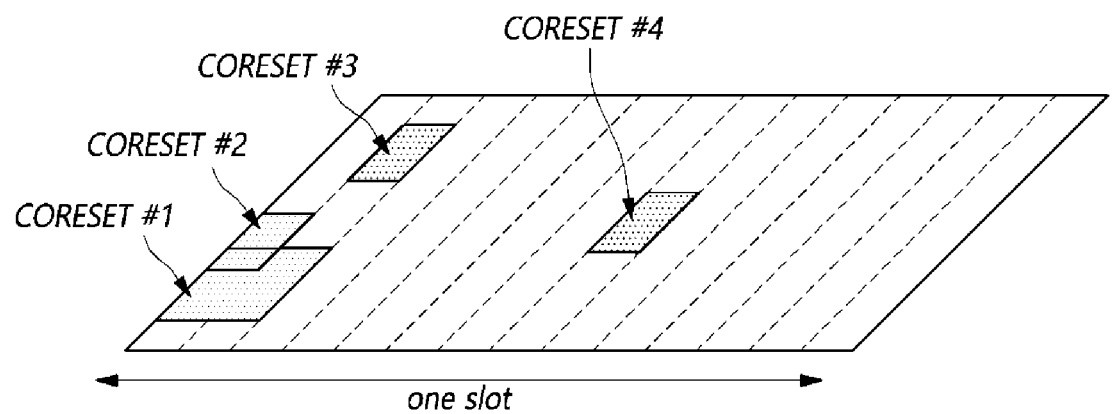
FIG. 7 is a view illustrating a CORESET.

FIG. 7 is a view illustrating a CORESET.

Referring to FIG. 7, the CORESET may exist in various forms within a carrier bandwidth within one slot. In the time domain, the CORESET may be constituted of up to 3 OFDM symbols. Further, the CORESET is defined as a multiple of 6 resource blocks up to the carrier bandwidth in the frequency domain.

The first CORESET is indicated through the MIB as part of the initial bandwidth part configuration to allow additional configuration and system information to be received from the network. After connection setup with the base station, the UE may receive and configure one or more CORESET information through RRC signaling.

As used herein, the frequency, frame, subframe, resource, resource block, region, band, subband, control channel, data channel, synchronization signal, various reference signals, various signals, and various messages related to new radio (NR) may be interpreted in various meanings as currently used or to be used in the future.

NR recently conducted in the 3GPP has been designed to meet various QoS requirements required for each of further divided and specified service requirements (use scenarios) as well as an enhanced data rate as compared to LTE. In particular, as representative service requirements (usage scenarios) of NR, enhancement mobile broadband (eMBB), massive machine type communication (mMTC), and ultra-reliable and low latency communications (URLLC) have been defined and, as a method for meeting the requirements for each service requirement (usage scenario), a flexible frame structure as compared with LTE needs to be designed.

Each service requirement (usage scenario) has different requirements for data rates, latency, reliability, and coverage, and it has been designed to efficiently multiplex radio resource units based on different numerologies (e.g., subcarrier spacing, subframe, TTI, etc.) as a method for efficiently meeting the requirements for each service requirement (usage scenario) via the frequency band constituting any NR system.

As a method for the purpose, for the numerology which has different subcarrier spacing values, there are discussions about a method of multiplexing and supporting based on TDM, FDM, or TDM/FDM via one or more NR component carriers and a scheme for supporting one or more time units in configuring a scheduling unit in the time domain. In this regard, in NR, a definition for subframe, as a type of time domain structure, was made, and it has been determined to define a single subframe duration constituted of 14 OFDM symbols of 15 kHz subcarrier spacing (SCS)-based normal CP overhead, which is the same as that of LTE, as reference numerology for defining subframe duration. Accordingly, in NR, the subframe has 1 ms time duration. However, unlike LTE, the subframe of NR is absolute reference time duration and, as a time unit which serves as a basis of actual uplink/downlink data scheduling, a slot and a mini-slot may be defined. In this case, the number (y value) of OFDM symbols constituting a corresponding slot is determined to be y=14 regardless of the SCS value in the case of normal CP.

Accordingly, any slot is constituted of 14 symbols. Further, depending on the transmission direction of the corresponding slot, all the symbols may be used for downlink (DL) transmission, for uplink (UL) transmission, or in the form of downlink (DL) portion+gap+uplink (UL) portion.

Further, a mini-slot is defined which is constituted of fewer symbols than the slot in any numerology (or SCS) and, based thereupon, a short time-domain scheduling interval for uplink/downlink data transmission/reception may be configured or a long time domain scheduling interval for uplink/downlink data transmission/reception may be configured through slot aggregation.

In particular, in the case of transmission/reception for latency-critical data, such as URLLC, if scheduling is performed in slot units which are based on 1 ms (14 symbols) which is defined in a frame structure which is based on numerology with a small SCS value such as 15 kHz, it may be difficult to meet the latency requirement. To that end, a mini-slot constituted of fewer OFDM symbols than the slot may thus be defined and, based thereupon, scheduling on latency-critical data such as URLLC may be performed.

Figure 8:
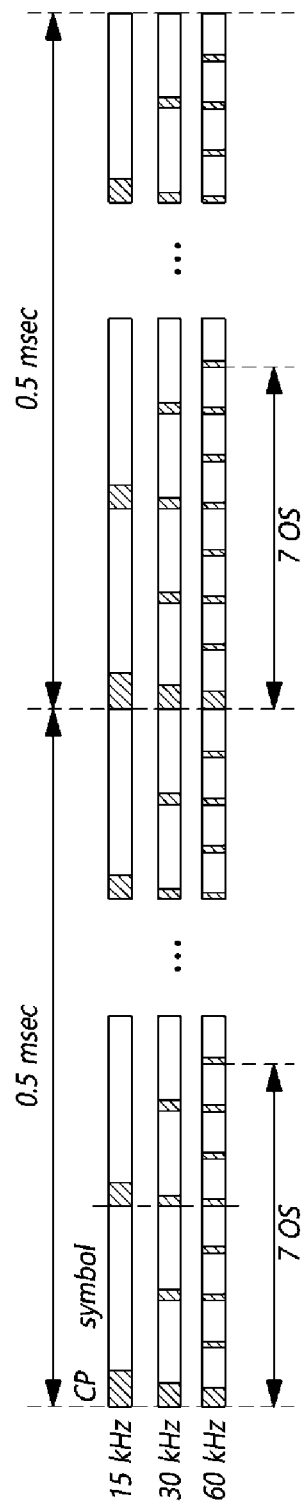
FIG. 8 is a view illustrating an example of a symbol level alignment in different subcarrier spacings (SCSs) to which the present embodiments may apply.

Alternatively, as described above, there is also considered a scheme for scheduling data according to the latency requirement based on the slot (or mini-slot) length defined per numerology by multiplexing and supporting numerologies with different SCSs in TDM and/or FDM in one NR carrier. For example, as shown in FIG. 8, in the case where the SCS is 60 kHz, the symbol length is reduced by about ¼ as compared with when the SCS is 15 kHz. Thus, if one slot is made up of 14 OFDM symbols, the 15 kHz-based slot length is 1 ms whereas the 60 kHz-based slot length is reduced to about 0.25 ms.

As such, discussions are underway on methods for meeting the requirements of URLLC and eMBB by defining different SCSs or different TTI lengths in NR.

Legacy LTE supports scalable bandwidth operation for any LTE component carrier (CC). In other words, according to the frequency deployment scenario, any LTE operator may configure a bandwidth from at least 1.4 MHz to at most 20 MHz in configuring one LTE CC, and the normal LTE UE supports transmission/reception capability of 20 MHz bandwidth for one LTE CC.

Figure 9:
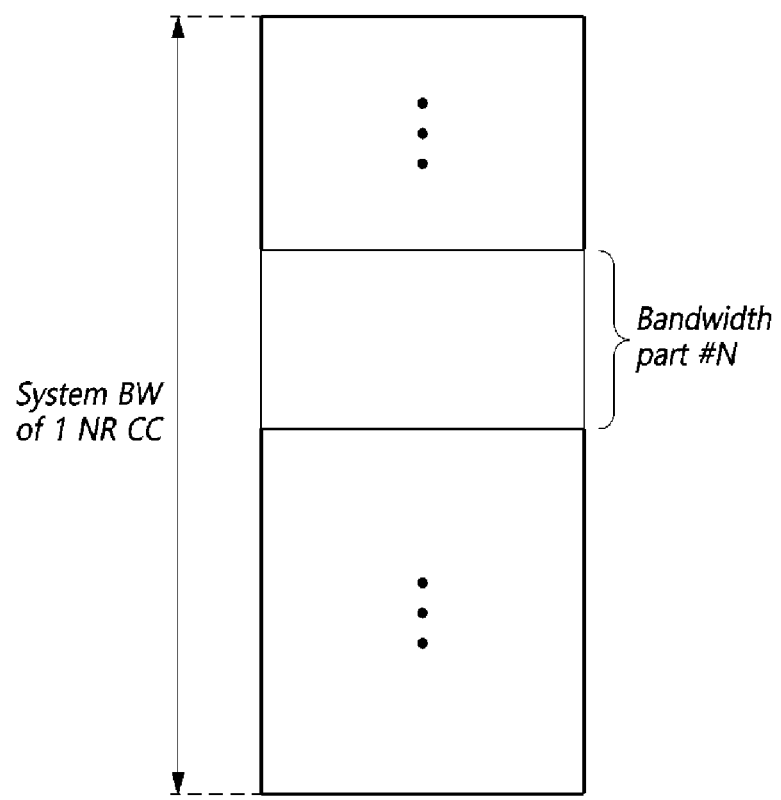
FIG. 9 is a view illustrating a conceptual example for a bandwidth part to which the present embodiments may apply.

However, NR is designed to be able to support NR UEs having different transmission/reception bandwidth capabilities through one wideband NR CC and is thus required to support flexible, wider bandwidth operations through activation and a different bandwidth part configuration per UE by configuring one or more bandwidth parts (BWPs) constituted of bandwidths subdivided for any NR CC as shown in FIG. 9.

Specifically, NR may configure one or more bandwidth parts through one serving cell configured in terms of UE, and the corresponding UE has been defined to activate one downlink (DL) bandwidth part and one uplink (UL) bandwidth part in the corresponding serving cell and use them for uplink/downlink data transmission/reception. Further, when a plurality of serving cells are configured in the corresponding UE, i.e., even CA-applied UEs have been defined to activate one downlink bandwidth part and/or uplink bandwidth part per serving cell and use them for uplink/downlink data transmission/reception using the radio resources of the corresponding serving cell.

Specifically, in any serving cell, an initial bandwidth part for initial access procedure of the UE is defined, one or more UE-specific bandwidth parts may be configured through dedicated RRC signaling for each UE, and a default bandwidth part for fallback operation may be defined for each UE.

However, it may be defined to activate and use a plurality of downlink and/or uplink bandwidth parts at the same time depending on the bandwidth part(s) and UE capability in any serving cell. However, in NR rel-15, it has been defined to activate and use only one downlink (DL) bandwidth part and uplink (UL) bandwidth part at any time in any UE.

The disclosure proposes a specific method for reducing delay or achieving efficient use of power by applying artificial intelligence (AI)/machine learning (ML) to a wireless interface.

Figure 10:
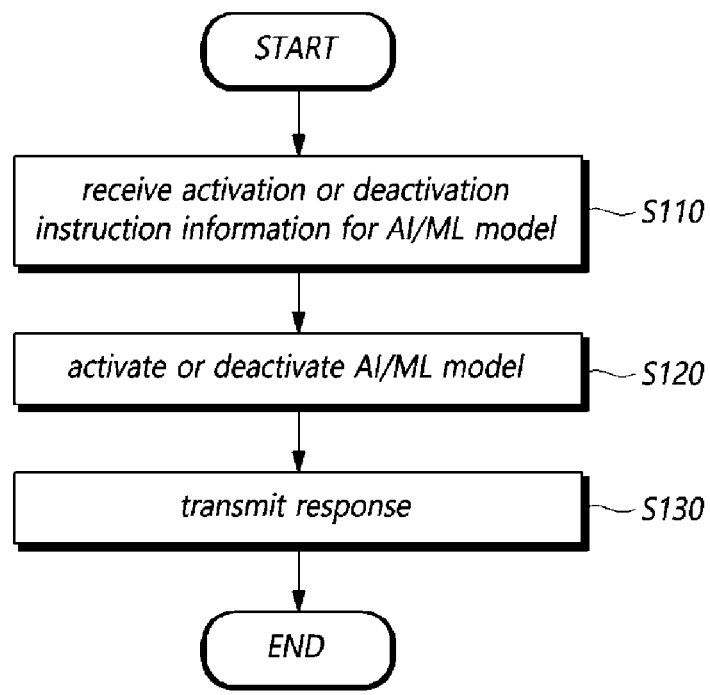
FIG. 10 is a view illustrating a structure of a functional framework for an AI/ML model according to an embodiment.

FIG. 10 is a view illustrating a structure of a functional framework for an AI/ML model according to an embodiment. The following description is made assuming such a framework.

In the case of the AI/ML model applied in the wireless communication network, training data may be initially generated in the network and the UE for training. The initial data may then be collected by one or more data collection entities. For inference, inference data for a UE-side model and a UE-part of a two-sided model may be directly input from the UE. Inference data for a network-side model or network-side (NW-side) of the two-sided model may be directly input from the network or may be sent from the UE. Likewise, in the case of monitoring, monitoring data for UE-side monitoring may be directly input from the UE. Monitoring data for network-side monitoring may be directly input from the network, or may be sent from the UE if necessary.

The model training block may include both initial training and model update. In general, model training is performed together with model development or consists of follow-up education for the developed model. AI/ML model development requires careful implementation consideration for power consumption, hardware area, latency, and synchronization with other PHY/MAC functions. After the model is developed and trained, the model should be stored in a model repository and transferred to the target device. The model should then be compiled into an executable file for inference.

Model management may include function/model monitoring, selection, activation, deactivation, switching, and fallback. These basic mechanisms are dealt with in functionality-based and model ID-based life cycle management (LCM). Some of the model monitoring, activation/deactivation, selection, switching, and fallback may be performed on the network side, or others may be performed on the UE side.

In the case of the functionality-based LCM, the UE may notify the network of the AI/ML function through UE capability reporting. Here, the function may indicate a specific use case or procedure of the UE in which it is expected to use AI/ML, such as AI/ML-based beam prediction, AI/ML-based positioning, or the like. Thereafter, the network may indicate activation and deactivation of each AI/ML function.

In the case of the model ID-based LCM, the UE may notify the network of the AI/ML function and the supported model ID through the UE capability reporting. Accordingly, the network may recognize the AI/ML model function of the UE and the model ID supported for the corresponding function. Thereafter, the network may again indicate activation and deactivation of each AI/ML function. However, unlike the functionality-based LCM, the model may be identified by the network through the allocated model ID. As the result, the network may activate/deactivate a specific model for the function. The network may instruct the UE to switch from one model to another model for the function.

When the AI/ML model is transferred, the network may control the AI/ML function for inference in the UE. This may include not only monitoring the performance of the function, but also activating and deactivating the AI/ML function of the UE.

In the case of the model ID-based LCM, the model may be identified by the network through the allocated model ID. The network may process the model with the model ID for inference task and model management (configuration, activation, deactivation, switching, monitoring, and replacement).

In the model ID-based scheme, the UE may notify the network of the AI/ML function and the supported model ID through the UE capability reporting. Accordingly, the network may recognize the AI/ML model function of the UE and the model ID supported for the corresponding function. In the case of collaboration level y, the AI/ML model may be stored outside the network and transferred to the UE through a wireless interface external mechanism. When the AI/IL model is transferred to the UE, the network may control the AI/ML function for inference in the UE. This may include model selection, activation, deactivation, switching, fallback, and monitoring. In the case of model ID-based LCM, model selection may be performed in a model product group distributed in the network or UE according to the performance and applicability of the model.

In the case of the collaboration level z, the model is stored in the network and transferred to the target device through the wireless interface. AI/ML model transmission may be performed through a wireless interface for a new model having a parameter or a parameter of a known model structure at the AI/ML model transmission receiving end. Transfer may include an entire model or a partial model. In the model transfer, in the case of model ID-based LCM, the UE may notify the network of the AI/ML function and supported model ID through UE capability reporting. Accordingly, the network may recognize the AI/ML model function of the UE and the model ID supported for the corresponding function.

Specific AI/ML algorithms and models may be studied for evaluation purposes, but AI/ML algorithms and models vary depending on implementation and are not expected to be specified. AI/ML functions vary depending on specific use cases and sub-use cases, and should focus on interactions between the network and the UE.

The collaboration levels between the network and the UE may be defined as follows.
1. Level 0 (or level x): No collaboration
2. Level 1 (or level y): Signaling-based collaboration without model transfer
3. Level 2 (or level z): Signaling-based collaboration with model transfer Depending on the collaboration level, transmission/reception of the AI/ML model or transmission/reception of related information may be performed between the base station and the UE.

Hereinafter, a method for using an AI/ML model in a wireless communication network is described with reference to the related drawings.

Figure 11:
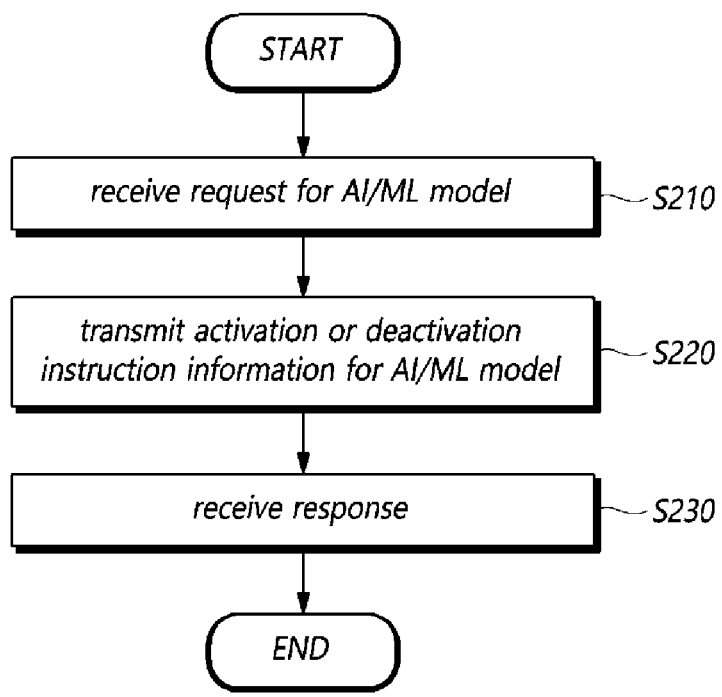
FIG. 11 is a view illustrating a procedure for a UE to use an AI/ML model according to an embodiment.

FIG. 11 is a view illustrating a procedure 100 for a UE to use an AI/ML model, according to an embodiment.

Referring to FIG. 11, the UE may receive activation or deactivation instruction information for the AI/ML model (S110).

For use the AI/ML model in wireless communication with a base station, the UE may transmit, to the base station, capability information about the UE related to whether the AI/ML model is supported. In other words, the UE may report, to the base station, all information required to apply the AI/ML model, such as whether to support the AI/ML model and information about the AI/ML model configured in the UE.

The AI/ML model that may be used in wireless communication between the base station and the UE may be divided into a UE-side model, a network-side model, and a two-sided model based on the entity that performs an inference operation through the AI/ML model. In other words, the AI/ML model is referred to as the UE-side model if inference for the AI/ML model is performed by the UE, and the AI/ML model is referred to as the network-side model if inference for the AI/ML model is performed by the base station. Further, if part of the inference is performed by the UE first, and then the rest is performed by the base station or vice versa, the AI/ML model is referred to as the two-sided model.

Further, for the AI/ML model, whether to transmit the AI/ML model may be determined based on a preconfigured cooperation level. According to an example, at cooperation level 1 where transmission of the AI/ML model is not required, the UE may receive a request for learning information and transmit a response according to the request.

In other words, the base station may request information about learning, such as the size of transmitted information, from the UE to exchange information before and after learning without direct model transmission between the base station and the UE. This assumes that information about the AI/ML model is already configured in the base station and the UE.

According to an example, the request for information about learning may be configured by higher layer signaling such as RRC signaling, and may be configured in such a manner that the UE reports it to the base station based on the corresponding configuration. Alternatively, according to an example, the base station may transmit a request for information about learning to the UE through the DCI in the PDCCH. Alternatively, the request for information about learning may be configured by higher layer signaling such as RRC signaling, and the base station may instruct to activate/deactivate the request for information about learning through the DCI in the PDCCH.

In this case, the UE may send a response to the base station as to whether to transmit information about learning through a feedback channel. When the UE responds as it being possible to transmit the information about learning, the base station may configure resources for information exchange in response to the response.

As another example, at cooperation level 2 where transmission of the AI/ML model is required, the UE may receive a request for AI/ML model information and transmit a response according to the request. To transmit a model before/after learning, the base station requests information about the model to be transmitted (size, number, etc.) from the UE. In other words, it is assumed that the information about the AI/ML model is not configured in the base station and the UE.

According to an example, the request for the information about the model to be transmitted may be configured by higher layer signaling such as RRC signaling, and may be configured in such a manner that the UE transmits it to the base station based on the corresponding configuration. Alternatively, according to an example, the base station may transmit a request for the information about the model to be transmitted to the UE through the DCI in the PDCCH. Alternatively, the request for the information about the model may be configured by higher layer signaling such as RRC signaling, and the base station may instruct to activate/deactivate the request for the information about the model through the DCI in the PDCCH.

In this case, the UE may send a response to the base station as to whether to transmit the model before/after learning through a feedback channel. When the UE responds as it being possible to transmit the model before/after learning, the base station may configure resources for model transmission in response to the response.

According to an example, the AI/ML model may perform life cycle management according to at least one of a functionality-based AI/ML model classification or a model ID-based AI/ML model classification. In other words, monitoring, selection, activation, deactivation, switching, and fallback for the AI/ML model may be performed based on a specific function or based on a specific model ID.

According to an example, the UE may transmit a request for use of the AI/ML model may be transmitted to activate or deactivate the AI/ML model between the UE and the base station. However, this is merely an example, and embodiments of the disclosure are not limited thereto. According to another example, without a request from the UE, the base station may transmit an instruction to activate or deactivate the AI/ML model based on the received UE capability.

According to an example, according to the functionality-based AI/ML model classification, the activation or deactivation instruction information for the AI/ML model may be received through at least one of higher layer signaling, MAC control element (CE), or downlink control information (DCI). For example, whether to apply at least one AI/ML model, activation period of a corresponding AI/ML model, and activation duration information may be configured through higher layer signaling such as RRC signaling, for a specific function such as beam prediction function. Alternatively, while the specific function is performed, the AI/ML model to be applied may be activated or deactivated through the MAC CE. Alternatively, while the specific function is performed, activation or deactivation of the AI/ML model may be instructed dynamically through the DCI.

According to another example, according to the model ID-based AI/ML model classification, activation or deactivation instruction information for the AI/ML model may be received based on the model ID. In this case, the UE may receive, from the base station, model ID information about the AI/ML model to be activated or deactivated for the specific function. In this case, the model ID information may be received through at least one of a downlink control channel or a downlink data channel.

Referring back to FIG. 11, the UE may activate or deactivate (S120) the AI/ML model based on the instruction information and transmit (S130) a response for activation or deactivation of the AI/ML model.

According to an example, it is assumed that whether to apply at least one AI/ML model, activation period of a corresponding AI/ML model, and activation duration information is configured through higher layer signaling, for a functionality-based AI/ML model. In this case, the UE may activate or deactivate the AI/ML model according to a determined activation period based on the configured information. Alternatively, the UE may activate or deactivate the AI/ML model to be applied based on the MAC CE. In this case, the UE may omit transmission of a response for activation or deactivation of the AI/ML model.

Alternatively, the UE may activate or deactivate the AI/ML model as instructed based on the DCI. In this case, the UE may transmit a response as to whether to activate or deactivate through the feedback channel.

According to another example, according to the model ID-based AI/ML, model classification, the UE may activate or deactivate the AI/ML model corresponding to the received model ID. In this case, the UE may transmit a response as to whether to activate or deactivate through the feedback channel. For example, the response may be a response to performing activation or deactivation or a response for acknowledging reception of the instruction.

When the AI/ML model is activated, the base station may configure a radio resource used for transmission/reception of input data or output data that may be used for the AI/ML model. In other words, radio resources for transmitting/receiving information necessary for performing a function through the activated AI/ML model may be allocated. The UE and the base station may perform a function through the AI/ML model using the corresponding wireless resources.

A case where the base station transmits an activation or deactivation instruction for an AI/ML model has been described above. The above-described technical spirit may also apply, in substantially the same manner, where the UE requests to activate or deactivate an AI/ML model or where a request for activating or deactivating an AI/ML model is sent between UEs through a sidelink.

Accordingly, there may be provided a method for using an AI/ML model in a wireless communication network for a specific procedure according to use of an AI/ML model.

Operations of the base station, related to the above-described UE operations, are described below with reference to the drawings.

Figure 12:
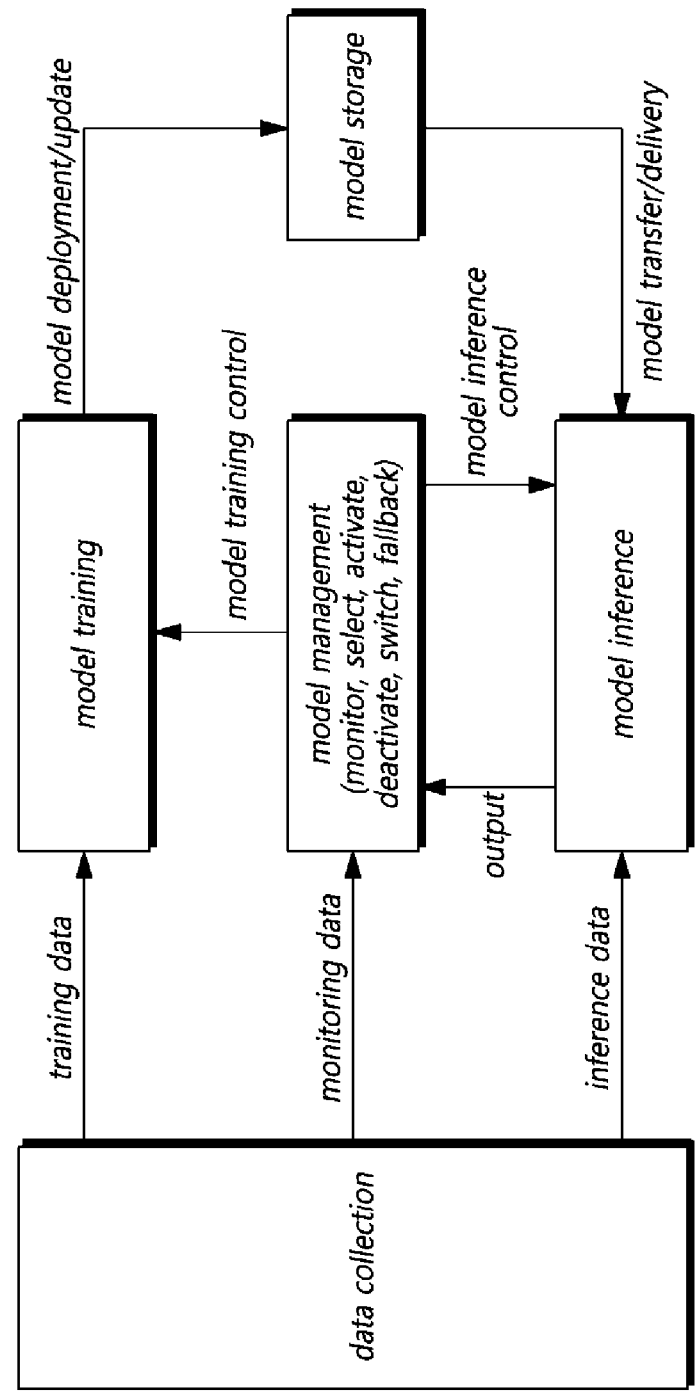
FIG. 12 is a view illustrating a procedure for a base station to use an AI/ML model according to an embodiment.

FIG. 12 is a view illustrating a procedure 200 for a base station to use an AI/ML model according to an embodiment.

Referring to FIG. 12, the base station may receive a request for an AI/ML model (S210).

According to an example, the UE may transmit a request for use of the AI/ML model may be transmitted to activate or deactivate the AI/ML model between the UE and the base station. However, this is merely an example, and embodiments of the disclosure are not limited thereto. According to another example, without a request from the UE, the base station may transmit an instruction to activate or deactivate the AI/ML model based on the received UE capability.

Referring back to FIG. 12, the base station may transmit activation or deactivation instruction information for an AI/IL model (S220).

According to an example, according to the functionality-based AI/ML model classification, the activation or deactivation instruction information for the AI/ML model may be transmitted through at least one of higher layer signaling, MAC control element (CE), or downlink control information (DCI). For example, whether to apply at least one AI/ML model, activation period of a corresponding AI/ML model, and activation duration information may be configured through higher layer signaling such as RRC signaling, for a specific function such as beam prediction function.

Alternatively, while the specific function is performed, the AI/ML model to be applied may be activated or deactivated through the MAC CE. Alternatively, while the specific function is performed, activation or deactivation of the AI/ML model may be instructed dynamically through the DCI.

According to another example, according to the model ID-based AI/IL model classification, activation or deactivation instruction information for the AI/ML model may be received based on the model ID. In this case, the base station may transmit, to the UE, model ID information about the AI/ML model to be activated or deactivated for the specific function. In this case, the model ID information may be transmitted through at least one of a downlink control channel or a downlink data channel.

Referring back to FIG. 12, the base station may receive a response to activation or deactivation of the AI/ML model (S230).

According to an example, it is assumed that whether to apply at least one AI/ML model, activation period of a corresponding AI/ML model, and activation duration information is configured through higher layer signaling, for a functionality-based AI/ML model. In this case, the UE may activate or deactivate the AI/ML model according to a determined activation period based on the configured information. Alternatively, the UE may activate or deactivate the AI/ML model to be applied based on the MAC CE. In this case, the UE may omit transmission of a response for activation or deactivation of the AI/ML model.

Alternatively, the UE may activate or deactivate the AI/ML model as instructed based on the DCI. In this case, the base station may receive, from the UE, a response as to whether to activate or deactivate through the feedback channel.

According to another example, according to the model ID-based AI/ML model classification, the UE may activate or deactivate the AI/ML model corresponding to the received model ID. In this case, the base station may receive, from the UE, a response as to whether to activate or deactivate through the feedback channel.

When the AI/ML model is activated, the base station may configure a radio resource used for transmission/reception of input data or output data that may be used for the AI/ML model. In other words, radio resources for transmitting/receiving information necessary for performing a function through the activated AI/ML model may be allocated. The UE and the base station may perform a function through the AI/ML model using the corresponding wireless resources.

Accordingly, there may be provided a method for using an AI/ML model in a wireless communication network for a specific procedure according to use of an AI/ML model.

Each embodiment related to a method for using an AI/ML model in a wireless communication network is described below in detail with reference to related drawings. The embodiments described below may be applied individually or in any combination thereof.

In particular, a specific procedure for determining whether to use an AI/ML model according to the collaboration level between the UE and the network using the above-described AI/ML model and embodiments related thereto are discussed. The following description may apply to any interaction between a base station and a UE to which an AI/ML model may be applied among various scenarios such as initial access and positioning specified in NR, but is not limited to a specific case.

Embodiment 1. A Procedure and Physical Layer Design According to Whether an AI/ML Model is Used 1-1. When the Base Station Determines Whether to Use the AI/ML Model The base station may determine to use the AI/ML model when it is determined that use of the AI/ML model is needed in performing communication with the UE. In this case, the base station may transfer a request for use of the AI/ML model to the UE using at least one resource element (RE).

According to an example, the base station may transmit the request for use of the AI/ML model through higher layer signaling such as RRC signaling. In this case, the base station may configure the use of the AI/ML model using RRC parameters. The UE may identify the related RRC parameters and, when the AI/ML model is configured to be used, determine whether the AI/ML model is supported and whether the AI/ML model is used. When the UE supports the AI/ML model and is in a state of being able to use the model, the UE may interact with the base station using the AI/ML model.

Alternatively, according to an example, the base station may configure AIML model-related information through higher layer signaling such as RRC signaling and may configure the same so that whether to use the AI/ML model is used is activated/deactivated through the DCI in the PDCCH. In this case, the UE may configure the AI/ML model-related information by receiving higher layer signaling and perform interaction using the AI/ML model only when activation of the AI/ML model is instructed through the DCI.

Upon identifying a request for using the AI/ML model from the base station, the UE may determine whether to use the AI/ML model. When the AI/ML model may be used, the UE may respond the base station with it being possible to use the AI/ML model through a feedback channel. In this case, the base station may configure resources for the AI/ML operation using one or more additional REs in response to the response.

When the UE does not support, or is unable to use, the AI/ML function, the UE may respond the base station with it being impossible to use the AI/ML model through the feedback channel. In this case, the base station may perform the interaction through a normal procedure.

1-2. When the UE Sends a Request for Whether to Use the AI/ML Model to the Base Station The UE may transfer a request for use of the AI/ML model to the base station using at least one RE.

According to an example, the UE may receive AI/ML model-related information through higher layer signaling such as RRC signaling, and it may be configured so that whether to use the AI/ML model is used is activated/deactivated through the UCI in the PUCCH. In this case, the UE may transmit a request for activating the AI/ML model to the base station through the UCI.

Upon receiving the activation request, the base station may determine whether to use the AI/ML model. When the base station determines to use the AI/ML model, the base station may respond the UE with it being possible to use the AI/ML model through a feedback channel. In this case, the base station may configure resources for AI/ML using at least one RE after 'N' time slots.

When the base station does not support, or determines not to use, the AI/ML function, the base station may respond the UE with it being impossible to use the AI/ML model through the feedback channel. In this case, the UE may perform the interaction through a normal procedure.

1-3. When a Request for Whether to Use the AI/ML Model is Made Between UEs

A UE UE(A) may transfer a request for using the AI/ML model to at least one other UE UE(B) using at least one RE. In this case, the UE UE(A) and the UE UE(B) may receive AI/ML model-related information through higher layer signaling such as RRC signaling.

According to an example, the UE UE(A) may request the UE UE(B) to use the AI/ML model through the SCI in the PSCCH. Alternatively, the base station may request the UE UE(B) to use the AI/ML model through the DCI in the PDCCH according to a request of the UE UE(A).

Upon receiving the activation request, the UE UE(B) may determine whether to use the AI/ML model. When the UE UE(B) determines to use the AI/ML model, the UE UE(B) may respond the UE UE(A) with it being possible to use the AI/ML model through a feedback channel. In this case, the UE UE(B) may configure resources for AI/ML using at least one RE after 'N' time slots.

When the UE UE(B) does not support, or determines not to use, the AI/ML function, the UE UE(B) may respond the UE with it being impossible to use the AI/ML model through the feedback channel. In this case, the UE UE(A) may perform the interaction through a normal procedure.

Embodiment 2. A Procedure and Physical Layer Design According to the AI/ML Collaboration Level 2-1. Level 0: No Collaboration In this case, there is no AI/ML between the base station and the UE, and communication may be performed according to the conventional manner.

2-2. Level 1: Signaling-Based Collaboration without Model Transfer

The base station may request information about learning, such as the size of transmitted information, from the UE to exchange information before and after learning without direct model transmission between the base station and the UE. In other words, it is assumed that information about the AI/ML model is already configured in the base station and the UE.

According to an example, the request for information about learning may be configured by higher layer signaling such as RRC signaling, and may be configured in such a manner that the UE reports it to the base station based on the corresponding configuration.

Alternatively, according to an example, the base station may transmit a request for information about learning to the UE through the DCI in the PDCCH.

Alternatively, the request for information about learning may be configured by higher layer signaling such as RRC signaling, and the base station may instruct to activate/deactivate the request for information about learning through the DCI in the PDCCH.

In this case, the UE may send a response to the base station as to whether to transmit information about learning through a feedback channel. When the UE responds as it being possible to transmit the information about learning, the base station may configure resources for information exchange in response to the response.

2-3. Level 2: Signaling-Based Collaboration with Model Transfer

To transmit a model before/after learning, the base station requests information about the model to be transmitted (size, number, etc.) from the UE. In other words, it is assumed that the information about the AI/ML model is not configured in the base station and the UE.

According to an example, the request for the information about the model to be transmitted may be configured by higher layer signaling such as RRC signaling, and may be configured in such a manner that the UE transmits it to the base station based on the corresponding configuration.

Alternatively, according to an example, the base station may transmit a request for the information about the model to be transmitted to the UE through the DCI in the PDCCH.

Alternatively, the request for the information about the model may be configured by higher layer signaling such as RRC signaling, and the base station may instruct to activate/deactivate the request for the information about the model through the DCI in the PDCCH.

In this case, the UE may send a response to the base station as to whether to transmit the model before/after learning through a feedback channel. When the UE responds as it being possible to transmit the model before/after learning, the base station may configure resources for model transmission in response to the response.

Configurations of a UE and a base station which may perform all or some of the embodiments described above in connection with FIGS. 1 to 12 are described below with reference to the drawings. However, to avoid duplicate description, some of the above-described descriptions will be omitted.

Figure 13:
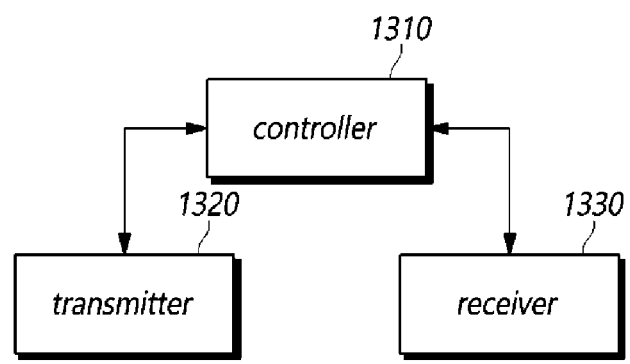
FIG. 13 is a view illustrating a configuration of a UE according to another embodiment.

FIG. 13 is a view illustrating a configuration of a UE 1300 according to another embodiment.

Referring to FIG. 13, according to another embodiment, a UE 1300 includes a controller 1310, a transmitter 1320, and a receiver 1330.

The controller 1310 controls the overall operation of the UE 1300 according to the method for using an AI/ML model in a wireless communication network as required to perform the above-described disclosure. The transmitter 1320 transmits uplink control information and data or messages to the base station via a corresponding channel. The receiver 1330 receives downlink control information and data or messages from the base station via a corresponding channel.

The controller 1310 may receive activation or deactivation instruction information for an AI/ML model. For use the AI/ML model in wireless communication with a base station, the controller 1310 may transmit, to the base station, capability information about the UE related to whether the AI/ML model is supported. In other words, the controller 1310 may report, to the base station, all information required to apply the AI/ML model, such as whether to support the AI/ML model and information about the AI/ML model configured in the UE.

The AI/ML model that may be used in wireless communication between the base station and the UE may be divided into a UE-side model, a network-side model, and a two-sided model based on the subject that performs an inference operation through the AI/ML model. In other words, the AI/ML model is referred to as the UE-side model if inference for the AI/ML model is performed by the UE, and the AI/ML model is referred to as the network-side model if inference for the AI/ML model is performed by the base station. Further, if part of the inference is performed by the UE first, and then the rest is performed by the base station or vice versa, the AI/ML model is referred to as the two-sided model.

Further, for the AI/ML model, whether to transmit the AI/ML model may be determined based on a preconfigured collaboration level. According to an example, at collaboration level 1 where transmission of the AI/ML model is not required, the UE may receive a request for learning information and transmit a response according to the request.

In other words, the base station may request information about learning, such as the size of transmitted information, from the UE to exchange information before and after learning without direct model transmission between the base station and the UE. This assumes that information about the AI/ML model is already configured in the base station and the UE.

According to an example, the request for information about learning may be configured by higher layer signaling such as RRC signaling, and may be configured in such a manner that the UE reports it to the base station based on the corresponding configuration. Alternatively, according to an example, the base station may transmit a request for information about learning to the UE through the DCI in the PDCCH. Alternatively, the request for information about learning may be configured by higher layer signaling such as RRC signaling, and the base station may instruct to activate/deactivate the request for information about learning through the DCI in the PDCCH.

In this case, the controller 1310 may send a response to the base station as to whether to transmit information about learning through a feedback channel. When the UE responds as it being possible to transmit the information about learning, the base station may configure resources for information exchange in response to the response.

As another example, at collaboration level 2 where transmission of the AI/ML model is required, the controller 1310 may receive a request for AI/ML model information and transmit a response according to the request. To transmit a model before/after learning, the base station requests information about the model to be transmitted (size, number, etc.) from the UE. In other words, it is assumed that the information about the AI/ML model is not configured in the base station and the UE.

According to an example, the request for the information about the model to be transmitted may be configured by higher layer signaling such as RRC signaling, and may be configured in such a manner that the UE transmits it to the base station based on the corresponding configuration. Alternatively, according to an example, the base station may transmit a request for the information about the model to be transmitted to the UE through the DCI in the PDCCH. Alternatively, the request for the information about the model may be configured by higher layer signaling such as RRC signaling, and the base station may instruct to activate/deactivate the request for the information about the model through the DCI in the PDCCH.

In this case, the controller 1310 may send a response to the base station as to whether to transmit the model before/after learning through a feedback channel. When the UE responds as it being possible to transmit the model before/after learning, the base station may configure resources for model transmission in response to the response.

According to an example, the AI/ML model may perform life cycle management according to at least one of a functionality-based AI/ML model classification or a model ID-based AI/ML model classification. In other words, monitoring, selection, activation, deactivation, switching, and fallback for the AI/ML model may be performed based on a specific function or based on a specific model ID.

According to an example, a request for use of the AI/ML model by the UE may be transmitted to activate or deactivate the AI/ML model between the UE and the base station. However, this is merely an example, and embodiments of the disclosure are not limited thereto. According to another example, without a request from the UE, the base station may transmit an instruction to activate or deactivate the AI/ML model based on the received UE capability.

According to an example, according to the functionality-based AI/ML model classification, the activation or deactivation instruction information for the AI/ML model may be received through at least one of higher layer signaling, MAC control element (CE), or downlink control information (DCI). For example, whether to apply at least one AI/ML model, activation period of a corresponding AI/ML model, and activation duration information may be configured through higher layer signaling such as RRC signaling, for a specific function such as beam prediction function. Alternatively, while the specific function is performed, the AI/ML model to be applied may be activated or deactivated through the MAC CE. Alternatively, while the specific function is performed, activation or deactivation of the AI/ML model may be instructed dynamically through the DCI.

According to another example, according to the model ID-based AI/IL model classification, activation or deactivation instruction information for the AI/ML model may be received based on the model ID. In this case, the controller 1310 may receive, from the base station, model ID information about the AI/ML model to be activated or deactivated for the specific function. In this case, the model ID information may be received through at least one of a downlink control channel or a downlink data channel.

The controller 1310 may activate or deactivate the AI/ML model based on the instruction information and transmit a response for activation or deactivation of the AI/ML model. According to an example, it is assumed that whether to apply at least one AI/ML model, activation period of a corresponding AI/ML model, and activation duration information is configured through higher layer signaling, for a functionality-based AI/ML model. In this case, the controller 1310 may activate or deactivate the AI/ML model according to a determined activation period based on the configured information. Alternatively, the controller 1310 may activate or deactivate the AI/ML model to be applied based on the MAC CE. In this case, the controller 1310 may omit transmission of a response for activation or deactivation of the AI/ML model.

Alternatively, the controller 1310 may activate or deactivate the AI/ML model as instructed based on the DCI. In this case, the controller 1310 may transmit a response as to whether to activate or deactivate through the feedback channel.

According to another example, according to the model ID-based AI/ML model classification, the controller 1310 may activate or deactivate the AI/ML model corresponding to the received model ID. In this case, the controller 1310 may transmit a response as to whether to activate or deactivate through the feedback channel.

When the AI/ML model is activated, the base station may configure a radio resource used for transmission/reception of input data or output data that may be used for the AI/ML model. In other words, radio resources for transmitting/receiving information necessary for performing a function through the activated AI/ML model may be allocated. The UE and the base station may perform a function through the AI/ML model using the corresponding wireless resources.

Accordingly, there may be provided a method and device using an AI/ML model in a wireless communication network for a specific procedure according to use of an AI/ML model.

Figure 14:
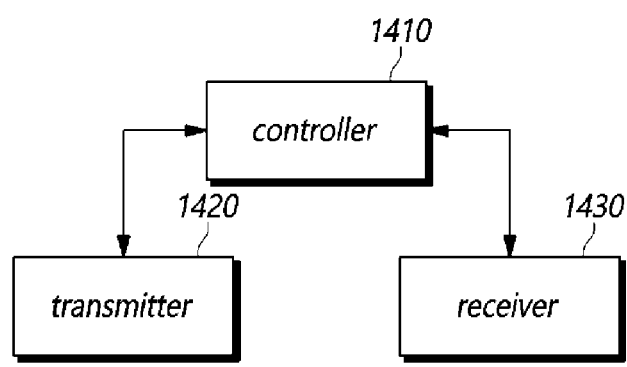
FIG. 14 is a view illustrating a configuration of a base station according to another embodiment.

FIG. 14 is a view illustrating a configuration of a base station 1400 according to an embodiment.

Referring to FIG. 14, according to an embodiment, a base station 1400 includes a controller 1410, a transmitter 1420, and a receiver 1430.

The controller 1410 controls the overall operation of the base station 1400 according to the method for using an AI/ML model in a wireless communication network as required to perform the above-described disclosure. The transmitter 1420 and the receiver 1430 are used to transmit or receive signals or messages or data necessary for performing the above-described disclosure, with the UE.

The controller 1410 may receive a request for an AI/ML model. According to an example, the UE may transmit a request for use of the AI/ML model may be transmitted to activate or deactivate the AI/ML model between the UE and the base station. However, this is merely an example, and embodiments of the disclosure are not limited thereto. According to another example, without a request from the UE, the controller 1410 may transmit an instruction to activate or deactivate the AI/ML model based on the received UE capability.

The controller 1410 may transmit activation or deactivation instruction information for an AI/ML model. According to an example, according to the functionality-based AI/ML model classification, the activation or deactivation instruction information for the AI/ML model may be transmitted through at least one of higher layer signaling, MAC control element (CE), or downlink control information (DCI). For example, whether to apply at least one AI/ML model, activation period of a corresponding AI/ML model, and activation duration information may be configured through higher layer signaling such as RRC signaling, for a specific function such as beam prediction function. Alternatively, while the specific function is performed, the AI/ML model to be applied may be activated or deactivated through the MAC CE. Alternatively, while the specific function is performed, activation or deactivation of the AI/ML model may be instructed dynamically through the DCI.

According to another example, according to the model ID-based AI/ML model classification, activation or deactivation instruction information for the AI/ML model may be received based on the model ID. In this case, the controller 1410 may transmit, to the UE, model ID information about the AI/ML model to be activated or deactivated for the specific function. In this case, the model ID information may be transmitted through at least one of a downlink control channel or a downlink data channel.

The controller 1410 may receive a response to activation or deactivation of the AI/ML model. According to an example, it is assumed that whether to apply at least one AI/ML model, activation period of a corresponding AI/ML model, and activation duration information is configured through higher layer signaling, for a functionality-based AI/ML model. In this case, the UE may activate or deactivate the AI/ML model according to a determined activation period based on the configured information. Alternatively, the UE may activate or deactivate the AI/ML model to be applied based on the MAC CE. In this case, the UE may omit transmission of a response for activation or deactivation of the AI/ML model.

Alternatively, the UE may activate or deactivate the AI/ML model as instructed based on the DCI. In this case, the controller 1410 may receive, from the UE, a response as to whether to activate or deactivate through the feedback channel.

According to another example, according to the model ID-based AI/ML model classification, the UE may activate or deactivate the AI/ML model corresponding to the received model ID. In this case, the controller 1410 may receive, from the UE, a response as to whether to activate or deactivate through the feedback channel.

When the AI/ML model is activated, the controller 1410 may configure a radio resource used for transmission/reception of input data or output data that may be used for the AI/ML model. In other words, radio resources for transmitting/receiving information necessary for performing a function through the activated AI/ML model may be allocated. The UE and the base station may perform a function through the AI/ML model using the corresponding wireless resources.

Accordingly, there may be provided a method and device using an AI/ML model in a wireless communication network for a specific procedure according to use of an AI/ML model.

The above-described embodiments may be supported by the standard documents disclosed in IEEE 802, 3GPP, and 3GPP2 which are radio access systems. In other words, steps, components, and parts not described to clarify the technical spirit in the embodiments may be supported by the above-described standard documents. Further, all the terms disclosed in the disclosure may be described by the standard documents disclosed above.

The present embodiments described above may be implemented through various means. For example, the present embodiments may be implemented by various means, e.g., hardware, firmware, software, or a combination thereof.

When implemented in hardware, the method according to the present embodiments may be implemented by, e.g., one or more application specific integrated circuits (ASICs), digital signal processors (DSPs), digital signal processing devices (DSPDs), programmable logic devices (PLDs), field programmable gate arrays (FPGAs), processors, controllers, micro-controllers, or micro-processors.

When implemented in firmware or hardware, the method according to the present embodiments may be implemented in the form of a device, procedure, or function performing the above-described functions or operations. The software code may be stored in a memory unit and driven by a processor. The memory unit may be positioned inside or outside the processor to exchange data with the processor by various known means.

The above-described terms, such as "system," "processor," "controller," "component," "module," "interface," "model," or "unit," described above may generally refer to computer-related entity hardware, a combination of hardware and software, software, or software being executed. For example, the above-described components may be, but are not limited to, processes driven by a processor, processors, controllers, control processors, entities, execution threads, programs, and/or computers. For example, both an application being executed by a controller or a processor and the controller or the processor may be the components. One or more components may reside within a process and/or thread of execution, and the components may be positioned in one device (e.g., a system, a computing device, etc.) or distributed in two or more devices.

The above-described embodiments are merely examples, and it will be appreciated by one of ordinary skill in the art various changes may be made thereto without departing from the scope of the present disclosure. Accordingly, the embodiments set forth herein are provided for illustrative purposes, but not to limit the scope of the present disclosure, and should be appreciated that the scope of the present disclosure is not limited by the embodiments. The scope of the disclosure should be construed by the following claims, and all technical spirits within equivalents thereof should be interpreted to belong to the scope of the disclosure.

What is claimed is:

1. A method for using an artificial intelligence (AI)/machine learning (ML) model by a user equipment (UE) in a wireless communication network, the method comprising:
receiving, by the UE, activation instruction information for one AI/ML model among a plurality of AI/ML models included in the UE from a base station;
activating, by the UE, the AI/ML model among the plurality of AI/ML models based on the instruction information;
transmitting, by the UE, a response to the activation of the AI/ML model to the base station; and
obtaining, by the UE, an inference data required for a communication operation with the base station using the AI/ML model,
wherein life cycle management is performed on the AI/ML model according to at least one of a functionality-based AI/ML model classification or a model ID-based AI/ML model classification,
wherein the method further comprising receiving monitoring data from a data collection entity,
wherein the life cycle management includes:
monitoring a performance of the AI/ML model based on the inference data and the monitoring data;
determining to switch the activated AI/ML model to other AI/ML model among the plurality of models based on the performance of the AI/ML model; and
when the switching is determined, deactivating the activated AI/ML model and activating the other AI/ML model.

2. The method of claim 1, further comprising transmitting, to a base station, capability information about the UE related to whether to support the AI/ML model.

3. The method of claim 1, wherein according to the functionality-based AI/ML model classification, the activation or deactivation instruction information is received through at least one of higher layer signaling, a MAC control element (CE), or downlink control information.

4. The method of claim 1, wherein according to the model ID-based AI/ML model classification, the activation or deactivation instruction information is received based on a model ID.

5. The method of claim 1, wherein the AI/ML model is divided into a UE-side model, a network-side model, or a two-sided model based on a subject of performing an inference operation through the AI/ML model.

6. The method of claim 1, further comprising, when the AI/ML model is activated, configuring a radio resource used for transmission/reception of input data or output data used for the AI/ML model.

7. The method of claim 1, wherein whether to transmit the AI/ML model is determined based on a preconfigured collaboration level.

8. The method of claim 7, further comprising, when transmission of the AI/ML model is not required, receiving a request for learning information and transmitting a response according to the request.

9. The method of claim 7, further comprising, when transmission of the AI/ML model is required, receiving a request for AI/ML model information and transmitting a response according to the request.

10. A user equipment (UE) using an artificial intelligence (AI)/machine learning (ML) model in a wireless communication network, comprising:
a transmitter;
a receiver; and
a controller configured to control an operation of the transmitter, the receiver and the AI/ML model,
wherein the controller performs the steps of:
receiving activation instruction information for one AI/ML model among a plurality of AI/ML models included in the UE from a base station,
activating the AI/ML model among the plurality of AI/ML models based on the instruction information,
transmitting a response to the activation of the AI/ML model to the base station, and
obtaining an inference data required for a communication operation with the base station using the AI/ML model,
wherein life cycle management is performed on the AI/ML model according to at least one of a functionality-based AI/ML model classification or a model ID-based AI/ML model classification,
wherein the controller receives monitoring data from a data collection entity,
wherein the life cycle management includes:
monitoring a performance of the AI/ML model based on the inference data and the monitoring data;
determining to switch the activated AI/ML model to other AI/ML model among the plurality of models based on the performance of the AI/ML model; and
when the switching is determined, deactivating the activated AI/ML model and activating the other AI/ML model.

11. The UE of claim 10, wherein the controller transmits, to a base station, capability information about the UE related to whether to support the AI/ML model.

12. The UE of claim 10, wherein according to the functionality-based AI/ML model classification, the activation or deactivation instruction information is received through at least one of higher layer signaling, a MAC control element (CE), or downlink control information.

13. The UE of claim 10, wherein according to the model ID-based AI/ML model classification, the activation or deactivation instruction information is received based on a model ID.

14. The UE of claim 10, wherein the AI/ML model is divided into a UE-side model, a network-side model, or a two-sided model based on a subject of performing an inference operation through the AI/ML model.

15. The UE of claim 10, wherein when the AI/ML model is activated, the controller configures a radio resource used for transmission/reception of input data or output data used for the AI/ML model.

16. The UE of claim 10, wherein whether to transmit the AI/ML model is determined based on a preconfigured collaboration level.

17. The UE of claim 16, wherein when transmission of the AI/ML model is not required, the controller receives a request for learning information and transmits a response according to the request.

18. The UE of claim 16, wherein when transmission of the AI/ML model is required, the controller receives a request for AI/ML model information and transmits a response according to the request.

* * * * *